(No Model.)
J. D. JONES.
METHOD OF EXTRACTING OLEAGINOUS MATTER FROM ANIMAL AND VEGETABLE SUBSTANCES.
No. 287,382. Patented Oct. 23, 1883.
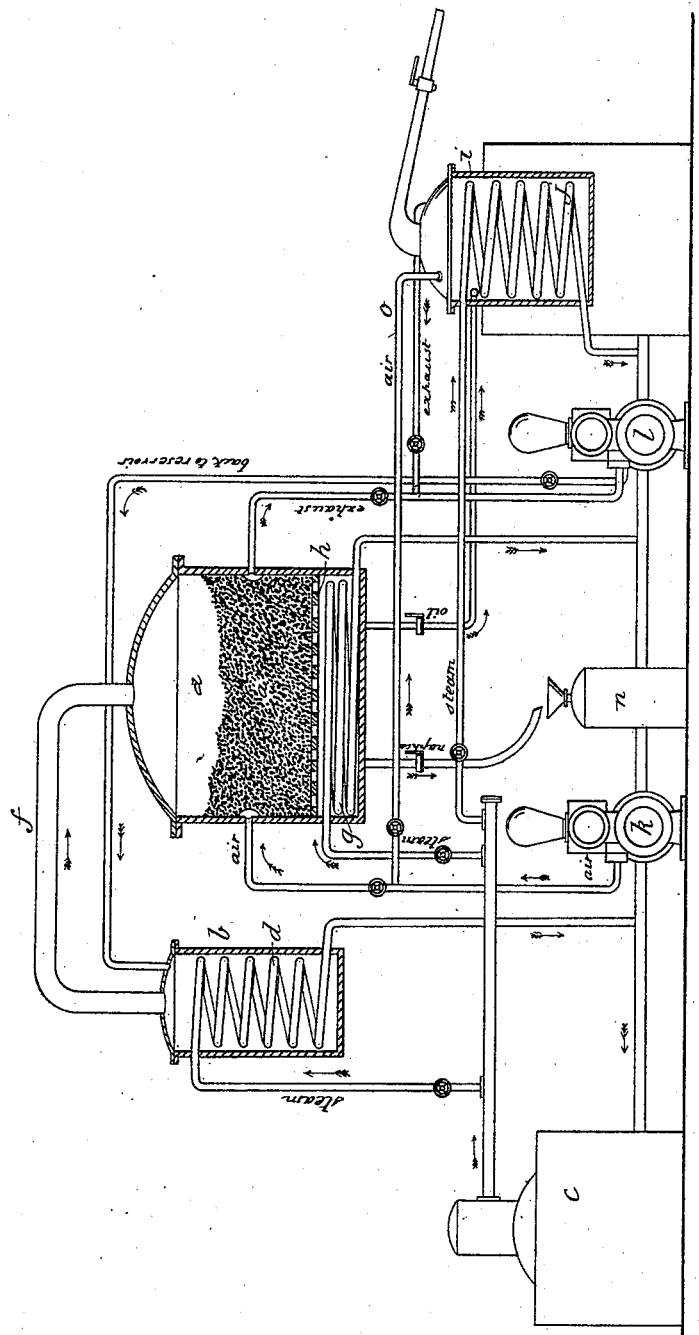
WITNESSES:
INVENTOR
BY
ATTORNEY

UNITED STATES PATENT OFFICE.

JOSEPH D. JONES, OF BROOKLYN, NEW YORK.

METHOD OF EXTRACTING OLEAGINOUS MATTER FROM ANIMAL AND VEGETABLE SUBSTANCES.

SPECIFICATION forming part of Letters Patent No. 287,382, dated October 23, 1883.

Application filed January 26, 1883. (No model.)

*To all whom it may concern:*

Be it known that I, JOSEPH D. JONES, a citizen of the United States, and a resident of Brooklyn, in the county of Kings and State of New York, have invented new and useful Improvements in Methods of Extracting Oleaginous Matter from Animal and Vegetable Substances, of which the following is a specification.

My invention relates to the method of extracting oleaginous, fatty, and other matters from animal scrap, linseed, cotton-seed, and other like substances by the use of naphtha or other light hydrocarbon vapors, on which a patent was granted to me the 6th day of February, 1883, No. 271,859, for an improvement in purifying the solid residual matters and removing therefrom the naphtha vapors by the use of compressed air and a vacuum process; and the invention consists, in this case, of a method of utilizing the same, means for purifying the liquid matters extracted from said solid residual products and removing the naphtha vapors from them, as well by withdrawing the oil from the rendering-tank, in which it is extracted from the solid matters by the naphtha, into a separate still or retort, and there treating the same with compressed air, and subsequently exhausting the air and exposing the oily matters in vacuum for more effectually removing the odors of the naphtha vapors and making the oil better and sweeter for use. The air is to be applied while the oil is heated and vaporized in the retort, and withdrawn when the oil is condensed, all as hereinafter fully described, reference being made to the accompanying drawing, which is partly a side elevation and partly a sectional elevation of apparatus that may be used in carrying out my invention; but as it may be accomplished by different forms or arrangements of apparatus, I do not limit myself to any particular arrangement.

*a* represents the tank in which the matters to be treated for the separation of the oily substances are to be placed, said tank being suitably constructed for inclosing the same, so as to be treated by the vapor of the naphtha or other volatile hydrocarbon generated in the vessel *b* by the heat of steam from the boiler *c*, circulating therethrough by the coil *d*, the naphtha vapors being delivered into the tank *a* by the pipe *f*.

The tank *a* contains a heating-coil, *g*, as is usually employed in such apparatus, for heating the substances under treatment by steam from the boiler, preparatory to the application of the naphtha vapor, and there is a perforated bottom, *h*, over the coil for the support of the matters to be treated, through which the steam ascends to act on them. I now propose to draw off the oily matters extracted in the rendering-tank *a* into a separate retort, *i*, containing a coil, *j*, to be heated by steam from the boiler *c*, for heating and vaporizing said matters therein, and then to force in fresh air by the pump *k*, for treating said matters with compressed air to purify them by absorption of the remaining naphtha vapors and odors, and for conducting them away when the oil has condensed in the retort by allowing the compressed air to escape, and then by exhausting the remaining air with the pump *l*, which, for the best effects, should produce a vacuum or partial vacuum in the retort.

The air may be exhausted into the rendering-tank or into the naphtha-tank for recovery of the naphtha contained in it by condensation.

The condensed naphtha is to be withdrawn from the rendering-tank into the vessel *n*, or other suitable receptacle, from which it may be returned to the vaporizing-tank *b* again.

The pump *k* may also connect with the rendering-tank *a*, for supplying air thereto when required.

What I claim, and desire to secure by Letters Patent, is—

In the process of extracting oils from vegetable and animal substances by treating them with naphtha vapors, the separating of the oils from the solid matters by withdrawing them from the rendering-tank into a separate retort or still, and separately treating them in a vaporized state with compressed air, then withdrawing the air and exposing the oils *in vacuo* when condensed, substantially as described.

In witness whereof I have hereunto signed my name in the presence of two subscribing witnesses.

JOSEPH D. JONES.

Witnesses:
EUGENE N. ELIOT,
W. J. MORGAN.